United States Patent [19]

Zwart

[11] Patent Number: 5,052,849
[45] Date of Patent: Oct. 1, 1991

[54] QUICK-LOCKING CONNECTOR

[75] Inventor: Klaas Zwart, Aberdeen, United Kingdom

[73] Assignee: Petroline Wireline Services, Ltd., Aberdeen, Scotland

[21] Appl. No.: 614,682

[22] Filed: Nov. 13, 1990

Related U.S. Application Data

[63] Continuation of Ser. No. 104,157, Oct. 5, 1987, abandoned.

[30] Foreign Application Priority Data

Oct. 8, 1986 [GB] United Kingdom ............... 8624112

[51] Int. Cl.$^5$ .............................................. F16B 7/20
[52] U.S. Cl. ...................................... 403/300; 403/9; 403/20; 403/317; 403/325; 403/349; 403/361
[58] Field of Search .................... 403/9, 19–20, 403/252, 300, 305, 320, 319, 317, 325–327, 341, 348–349, 353–354, 361; 24/591, 593, 596, 597; 285/81, 85, 92

[56] References Cited

U.S. PATENT DOCUMENTS

| | | | |
|---|---|---|---|
| 805,674 | 11/1905 | Senderling | 403/348 |
| 1,130,726 | 3/1915 | Greve | 403/348 X |
| 2,459,953 | 1/1949 | Mills | 403/9 |
| 2,551,577 | 5/1951 | Baum | 403/9 |
| 2,617,166 | 11/1952 | Kaufmann | 403/349 X |
| 2,878,543 | 3/1959 | Newcomer | 411/551 |
| 2,881,499 | 4/1959 | Summers et al. | 411/551 |
| 3,029,093 | 4/1962 | Willis | 285/81 |
| 3,053,559 | 9/1962 | Frick | 403/9 |
| 4,260,180 | 4/1981 | Halushka et al. | 285/85 |
| 4,406,485 | 9/1983 | Giebeler | 285/391 |
| 4,784,543 | 11/1988 | Mitchell et al. | 403/349 X |

FOREIGN PATENT DOCUMENTS

| | | | |
|---|---|---|---|
| 928506 | 12/1947 | France | 403/349 |
| 381816 | 9/1973 | U.S.S.R. | 403/319 |
| 106422 | 5/1917 | United Kingdom | 403/349 |
| 320602 | 10/1929 | United Kingdom | 403/349 |

Primary Examiner—Andrew V. Kundrat
Assistant Examiner—Franco S. De Liguori
Attorney, Agent, or Firm—Lalos & Keegan

[57] ABSTRACT

The quick-locking connector comprises a tubular female body member 14, open at one end to receive a male member 10 therein. A latch 18 is located within the female body member 14 spring-urged towards the open end to engage the male member 10. A plurality of external, longitudinally spaced bearing surfaces 40–43 are provided on the male member 10 and complementary bearing surfaces 40–43 are provided internally of the female body member such that after entry of the male member a quarter turn of the members brings the respective bearing surfaces 40–43 into engagement at longitudinally spaced intervals against pressure from the latch to provide a longitudinally spaced plurality of complementary bearing surfaces 40–41 to be subjected to axial impact forces tending to pull the male and female members apart. A plurality of complementary bearing surfaces 42, 43 may be provided to be subjected to impact forces in the opposite axial direction. The bearing surfaces of the male member 10 are provided by at least two longitudinally spaced flange members 25, 26. Apertures 30, 31 are provided in the female body member 14 and latch 18 respectively and are adapted to co-operate when the male member 10 is locked within the body to permit entry of a lever member to provide leverage for moving the latch against its spring pressure to release the male member.

4 Claims, 2 Drawing Sheets

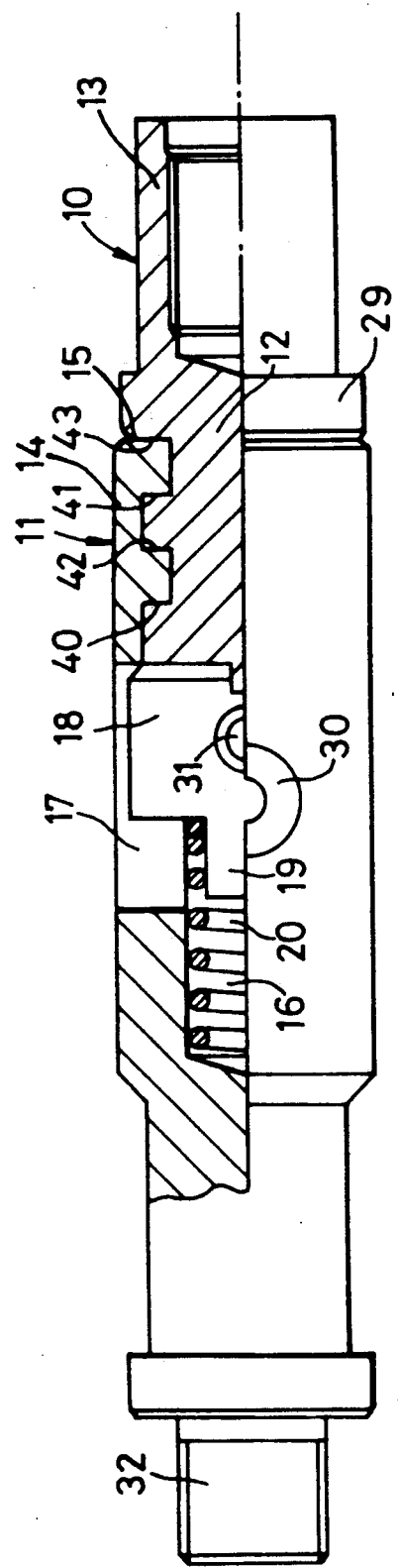
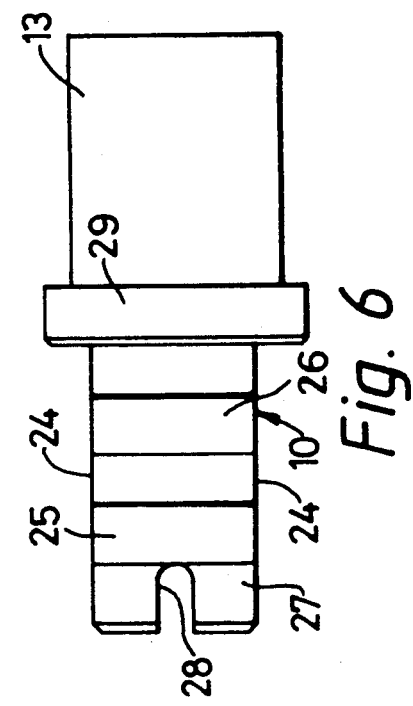
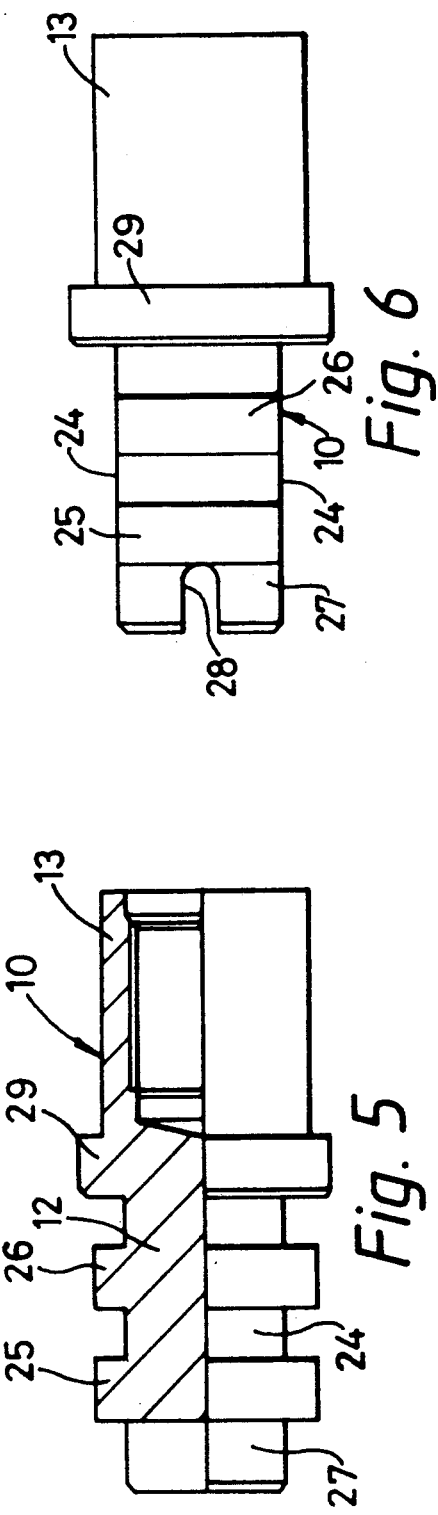

QUICK-LOCKING CONNECTOR

This is a continuation of copending application Ser. No. 07/104,157 filed on Oct. 5, 1987, now abandoned.

This invention relates to a quick-locking connector, particularly, but not exclusively for use in the gas-or oil-recovery industry.

One such connector is known, in which a male part engages in a tubular female part against a spring pressure latch and after a quarter turn locks in the female part. The male and female parts have two complementary bearing surfaces only one of which is subjected to the impact forces depending on whether the impact is upward or downward. The head of the male part has a transverse slot which engages a pin on the spring pressure latch when the members are locked, so to unlock the members the latch is firstly manually retracted against the spring pressure to allow the male member to rotate a quarter turn prior to withdrawal. To permit manual retraction, slotted openings are provided in the tube of the female member and ribbed edges of the latch project therethrough for finger grip.

The known connector has several disadvantages, principally that the spring pressure, in order to allow manual retraction is too weak relative to the mass of the latch, and as a result the latch cannot resist heavy impact. During use therefore, when the connector is vertical with the male member lowermost, a heavy impact can cause the latch to jump upwards out of engagement with the male member and that could cause separation of the male and female members and the consequent lose of equipment connected to the male member.

Just as important is that the single effective complementary bearing surfaces of the male and female members are insufficient to sustain heavy upward or downward impact, as a result of which the connector is liable to fracture under heavy loading, particularly upward loading which tends to pull the male and female members apart.

Consequently, the known connector can only be safely used for light work, such as down-hole running pressure or temperature gauges or instrumentation generally.

An object of this invention is to provide an improved quick-locking connector.

According to the present invention there is provided a quick-locking connector comprising a tubular female body member open at one end to receive a male member therein, a latch located within the body spring urged towards the open end to engage the male member, a plurality of external, longitudinally spaced bearing surfaces on the male member and complementary bearing surfaces internally of the female body member such that after entry of the male member a quarter turn brings the respective bearing surfaces into engagement at longitudinally spaced intervals against pressure from the latch to provide a longitudinally spaced plurality of complementary bearing surfaces to be subjected to axial impact forces tending to pull the male and female members apart.

Preferably, a plurality of complementary bearing surfaces are also provided to be subjected to impact forces in the opposite axial direction.

Preferably, the bearing surfaces of the male member are provided by at least two longitudinally spaced flange members.

Preferably also, aperture means is provided in the female body member and in the latch adapted to co-operate when the male member is locked within the body to permit entry of a lever member to provide leverage for moving the latch against its spring pressure to release the male member.

An embodiment of the present invention will now be described, by way of example, with reference to the accompanying drawings, in which:

FIG. 1 is a side elevation partially in section, of a quick-locking connector according to the invention;

FIG. 5 is a side elevation, half in section of the male member; and

FIG. 6 is a side elevation of the male section at 90° rotation.

Figure 3:
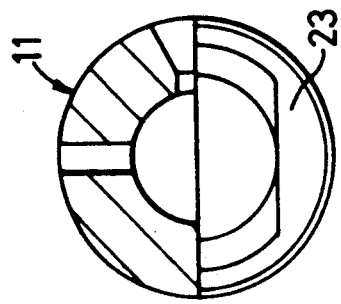
FIG. 3 is a sectional end elevation on the line III—III of FIG. 2.
Figure 2:
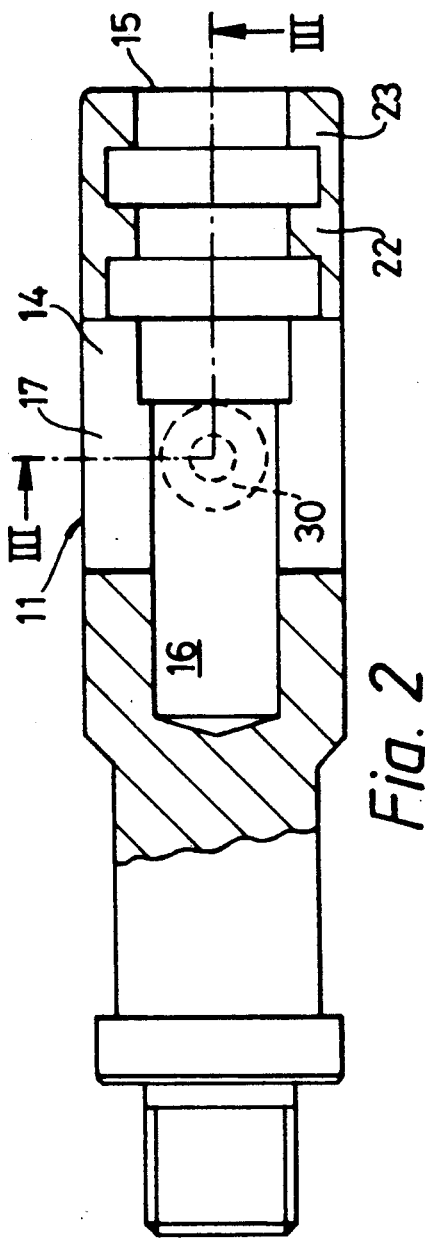
FIG. 2 is a part sectional side elevation of the tubular female member.

Referring to the drawings, the connector comprises male and female members 10, 11, comprising respectively a solid flanged body 12 terminating at one end, its outer end, in a cylindrical skirt 13, and a tubular body 14 open at one end 15 to receive the body 12 of the male member.

Figure 4:
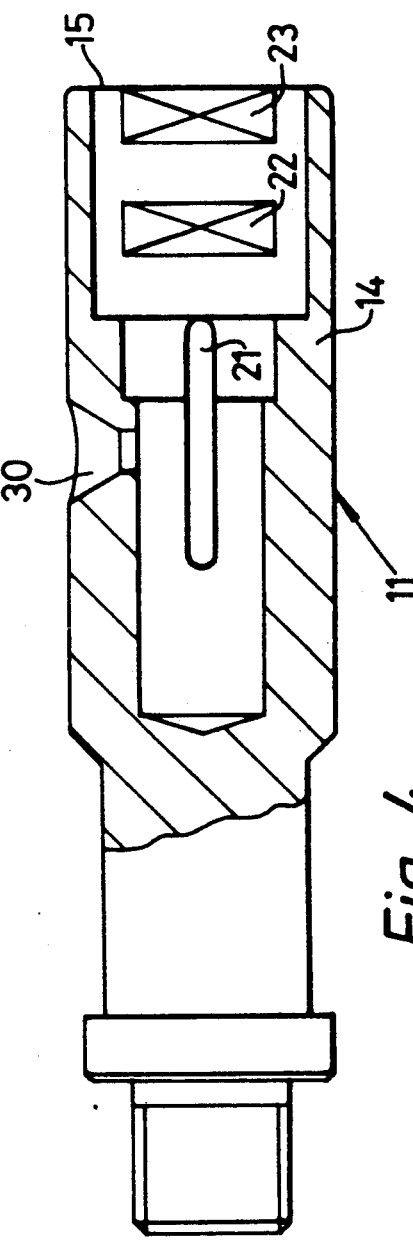
FIG. 4 is a view similar to FIG. 2 at 90° rotation.

The interior of the tubular body 14 is contoured to provide, at the end remote from the open end 15, a socket 16 opening into a chamber 17 of enlarged diameter. A latch 18 in the form of a flat T-shaped plate locates in the chamber and has a stem 19 around which is a compression spring 20 extending into the socket 16. The sides of the latch plate 18 extend into a pair of diametrically opposed longitudinal slots 21 (FIG. 4) in the body 14.

The interior of the body 14 also includes internally extending longitudinally spaced flanges 22, 23, each of which has diametrically opposed segments and which in use act as longitudinally spaced bearing surfaces with corresponding flanged portions 25, 26 on the flanged body 12 of the male member 10, the resulting longitudinally spaced plurality of complementary bearing surfaces being numbered 40 to 43 on FIG. 1.

In use, with the connector vertical and the male member 10 lowermost, heavy upward impact forces, which tend to pull the male and female members apart, cause a reaction on each of the longitudinally spaced complementary bearing surfaces 40, 41, but the plurality of these surfaces distributes the loading, as a result of which the connector is capable of withstanding relatively heavy impacts. Downward impact forces, which may be only half as severe as upward impact forces, cause a reaction on at least complementary bearing surface 43 but preferably also on complementary bearing surfaces 42.

The flanged body 12 is substantially elliptical in cross section with one pair of opposed sides 24 flattened parallel to the major axis. Flanges 25, 26 extend from the other opposed sides. The flanged body 12 terminates at the end remote from the skirt 13 in a cylindrical wall 27 in which a pair of diametrically opposed longitudinal slots 28 are located, lying along said major axis.

To assemble the connector, the flanged body 12 is inserted into the tubular body 14 with the flattened sides 24 passing between the segmental flanges 22, 23 of the body 14. The wall 27 strikes the latch plate 18 which is pushed further into the tubular body 14 against its compression spring 20. When the flanged body 12 is fully inserted it is turned through 90°; this locates the flanges 25, 26 into engagement with the segmental flanges 22, 23 and brings the latch plate 18 into line with the slots 28 into which the latch plate locates under pressure from the compression spring 20.

The flanged body 12 is fully inserted when a shoulder 29 between the body 12 and skirt 13 abuts the face at the end 15 of the tubular body 14.

When it is desired to release the male portion 10 from the female portion 11, it is necessary to withdraw the latch plate 18 from the slots 28. To permit this, a countersunk hole 30 is provided in the body 14, and an associated hole 31 (FIG. 1) is provided in the latch plate but off-set longitudinally relative to the hole 30 towards the end 15 of the body 14.

Thus, a lever can be inserted into holes 30, 31 at an angle to the transverse axis of the connector and pivoted about hole 30 to withdraw the plate 18 from slots 28, against the pressure of spring 20. The body 12 can then be rotated through 90° and withdrawn axially.

The connector as hereinbefore described is advantageous in that:

a) The latch 18, being a flat plate has a light mass relative to the compression spring 20 and will not therefore tend to jump out of engagement with the slots 28 of the flanged body on heavy impact.

b) The provision of two flanges 25, 26 on the body 12 in engagement with the segmental flanges 22, 23 of the body 14 provide a combined bearing surface which can withstand heavy loading.

Thus, the connector as hereinbefore described can be used for heavy duty down-hole wire line work.

The end of the tubular body remote from the open end 15 terminates in a stud 32 which may be threaded, for connection to a piece of down-hole equipment, and the skirt 13 of the member 10 is also for attachment to another piece of equipment and may also be threaded. Alternatively, the male and female members may be integral parts of pieces of equipment.

In the preferred embodiment, holes 30, 31 provide for leverage of the latch against its spring, but other means may be provided to assist such movement of the latch. Leverage however is considered to be the simplest method and allows for a relatively stronger spring.

Also in the preferred embodiment two complementary bearing surfaces 40, 41 are provided to absorb upward impact, but more than two such complementary bearing surfaces may be provided.

I claim:

1. A quick-locking connector comprising a tubular female body member open at one end to receive a male member therein, a latch located within the female body member and urged by a spring towards said open end to engage said male member, a plurality of external, longitudinally spaced bearing surfaces on said male member and complementary bearing surfaces longitudinally spaced internally on said female body member such that, after entry of said male member, a quarter turn of said male member brings the respective bearing surfaces into engagement at longitudinally spaced intervals against pressure from said latch to provide a plurality of longitudinally spaced complementary bearing surfaces to be subjected to axial impact forces tending to pull the male and female members apart and a plurality of complementary bearing surfaces on said female body member and said male member to be subjected to impact forces in the opposite axial direction, characterized in that said latch is of light mass relative to said spring which urges said latch towards said open end of said tubular female body member, and first aperture means provided in the tubular female body and second aperture means provided in said latch, said second aperture means located offset longitudinally relative to said first aperture means located offset longitudinally relative to said first aperture means towards said open end when said male member is located within said female body member to permit entry of a lever member through said first and second aperture means at an acute angle relative to the longitudinal axis of the female member to provide leverage for moving said latch against pressure from said spring to release said male member.

2. A connector according to claim 1, characterized in that said tubular female body member is contoured internally to provide, at the end remote from said open end, a socket which opens into a chamber, and in which said latch is in the form of a flat T-shaped plate and locates in said chamber, said latch having a stem around which is said spring which extends into said socket, and a cross piece having sides which extend into a pair of diametrically opposed longitudinal slots in said tubular female body.

3. A connector according to claim 1 or 2, characterized in that said bearing surfaces of said male member are provided by at least two longitudinally spaced flange members.

4. A connector according to claim 3, characterized in that said bearing surfaces of said female body member are provided by longitudinally spaced flanges, each of which has diametrically opposed segments.

* * * * *